Dec. 21, 1926.

A. JOHNSSON

COUPLING DEVICE FOR CHAINS, ROPES, AND THE LIKE

Filed Nov. 6, 1923

Inventor:
Anders Johnsson
By ......
Atty.

Patented Dec. 21, 1926.

1,611,197

UNITED STATES PATENT OFFICE.

ANDERS JOHNSSON, OF STEHAG, SWEDEN.

COUPLING DEVICE FOR CHAINS, ROPES, AND THE LIKE.

Application filed November 6, 1923, Serial No. 673,134, and in Sweden February 9, 1923.

My invention relates to a coupling device for chains, ropes and the like and has for its object to be adapted to all cases where it is required to quickly and securely connect chains and the like or to fasten chains, ropes and the like into eyes, rings and the like. The improved device comprises two adjacently arranged concentrically movable open rings which ae connected with the ends of two interconnected chains in such a manner that the rings can be rotated relative to each other. In one position, the openings in the rings register with each other, while upon a pull on the said chains the rings are rotated relative to each other into such a position that the openings in the rings are displaced preferably about 180° in relation to each other.

Figure 1:
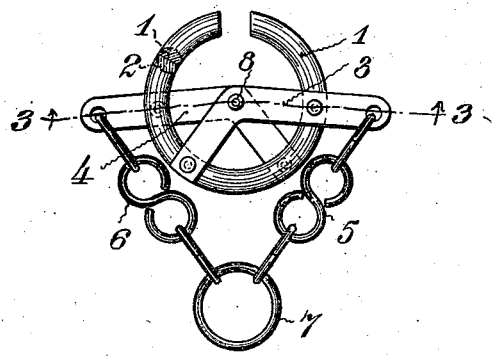
Figure 3:
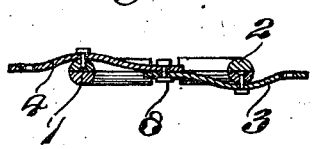
Figure 2:
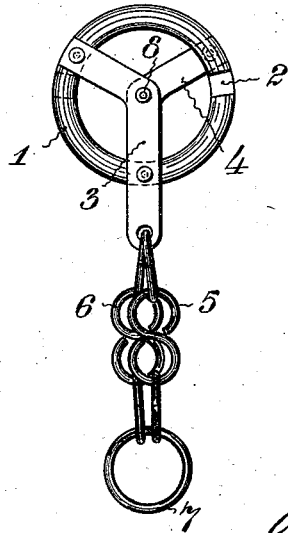

The invention is illustrated in the accompanying drawing, in which Figures 1 and 2 show the coupling device in respectively open and closed position. Fig. 3 is a transverse section along 3—3 of Fig. 1.

According to the drawing, the two adjacently arranged open rings 1 and 2, each having an opening are preferably of the same diameter and are of semi-circular cross-section, as indicated in Figure 1, their flat faces being juxtaposed and sliding on each other.

However, the invention is not restricted to the particular shape of the rings which on the contrary may vary considerably. A bell crank lever 3 and 4 respectively is fixed to each ring. To the projecting arm of each of the bell crank levers one end of a chain 5 and 6 respectively is connected, the other end of the chain being fastened to a common ring 7. The bell crank levers 3, 4 are pivotally mounted on and connected with each other by means of a pin 8 arranged in the common centre of the two rings, the pin 8 at the same time serving to hold the rings together. Obviously the revoluble connecting device for the rings may also be arranged in a different manner, and the rings in the embodiment as shown may be integral with the bell crank levers.

The improved coupling device is opened by a rotation of the rings into the position shown in Figure 1, in which case the openings in the rings register with each other, so that a ring, an eye or the like, to which the coupling device shall be fastened, may be inserted therein. As soon as the least pull is exerted upon the ring 7, the rings 1 and 2 will be rotated in relation to each other into the position shown in Figure 2, in which case the coupling device is closed, the openings in the rings being displaced about 180°. Any risk that the rings may open of themselves when in use is practically impossible.

I claim as my invention:

1. In a device of the class described, comprising two juxtaposed concentric rings of substantially equal diameter, and each having an opening, means pivotally connecting the rings at their center, and means connected to said rings for relatively rotating said rings about their pivotal axes to move said openings into and out of registry with each other.

2. In a device of the class described, comprising two juxtaposed concentric rings, each having an opening, a bell crank member secured to each ring, a common pivot interconnecting said bell crank members in the center of said rings, a chain attached to the projecting arm of each bell crank member, and a member connecting the free ends of said chains, said rings under the influence of a force normally acting upon said member being relatively rotated about said pivot into a position, in which the openings in said rings are displaced about half a turn relative to each other.

In testimony whereof, I have signed my name to this specification.

ANDERS JOHNSSON.